United States Patent [19]

Le Fol

[11] Patent Number: 4,768,760
[45] Date of Patent: Sep. 6, 1988

[54] HYDRO-ELASTIC ARTICULATION

[75] Inventor: Marcel Le Fol, Chateaugiron, France

[73] Assignees: Automobiles Peugeot, Paris; Automobiles Citroen, Neuilly-sur-Seine, both of France

[21] Appl. No.: 5,667

[22] Filed: Jan. 21, 1987

[30] Foreign Application Priority Data

Jan. 22, 1986 [FR] France ............................. 86 00875
Mar. 4, 1986 [FR] France ............................. 86 02983

[51] Int. Cl.⁴ ............................................. F16F 5/00
[52] U.S. Cl. ............................... 267/140.1; 248/562; 267/219
[58] Field of Search .................... 188/268; 248/562; 267/35, 140.1, 141, 141.1, 141.4, 154, 219

[56] References Cited

U.S. PATENT DOCUMENTS

| | | |
|---|---|---|
| 2,226,388 | 12/1940 | Richter . |
| 2,387,066 | 10/1945 | Harding . |
| 2,540,130 | 2/1951 | Lee . |
| 2,926,881 | 3/1960 | Painter ............................. 267/141.4 |
| 3,202,388 | 8/1965 | Goodwin . |
| 3,586,403 | 6/1971 | Cooley . |
| 3,642,268 | 2/1972 | Hipsher ......................... 267/140.1 X |
| 3,651,902 | 3/1972 | Peddinghaus . |
| 3,731,771 | 5/1973 | Borgo . |
| 3,795,390 | 3/1974 | Kendall et al. . |
| 3,958,654 | 5/1976 | Le Salver et al. . |
| 3,970,162 | 7/1976 | Le Salver et al. . |
| 4,054,277 | 10/1977 | Sirven . |
| 4,159,091 | 6/1979 | Le Salver et al. . |
| 4,215,842 | 8/1980 | Brenner et al. . |
| 4,262,886 | 4/1981 | Le Salver et al. . |
| 4,277,056 | 7/1981 | Ticks . |
| 4,319,768 | 3/1982 | Youngdale . |
| 4,336,968 | 6/1982 | Hibner . |
| 4,422,779 | 12/1983 | Hamaekers et al. . |
| 4,519,211 | 5/1985 | Sedille et al. . |
| 4,568,069 | 2/1986 | Poupard ........................... 267/140.1 |
| 4,588,173 | 5/1985 | Gold et al. . |
| 4,688,662 | 8/1987 | Correll ............................ 267/154 X |

FOREIGN PATENT DOCUMENTS

| | | |
|---|---|---|
| 0014742 | 9/1980 | European Pat. Off. . |
| 0027751 | 4/1981 | European Pat. Off. . |
| 0036470 | 9/1981 | European Pat. Off. . |
| 0044908 | 2/1982 | European Pat. Off. . |

(List continued on next page.)

OTHER PUBLICATIONS

Patents Abstracts of Japan, vol. 10, No. 10, Dated Jan. 16, 1986.
Patents Abstracts of Japan, vol. 6, No. 26, Dated Feb. 16, 1982.
Patents Abstracts of Japan, vol. 10, No. 62, Dated Mar. 12, 1986.
Report, "Theory of the Hydraulically Damped Motor Mount with a Long Nozzle".
Report Comparing Motor Mounts (with English Translation).
Drawing Dated Oct. 5, 1979 with Attachments.
Freudenberg Drawing 10780 Dated Nov. 2, 1979.
"The Use of Engine Mounts with Integrated Hydraulic Damping in Passenger Cars", presented by Le Salver, 1983.

Primary Examiner—Duane A. Reger
Attorney, Agent, or Firm—Burns, Doane, Swecker & Mathis

[57] ABSTRACT

The articulation comprises an inner armature (4, 9) and an outer armature (5) interconnected by a mass (3, 8) of elastomer, in which are formed two chambers (6, 7) filled with liquid and interconnected through a passageway (13). The articulation is formed by two elements (1, 2) each constituted by part (4, 9) of the inner armature and a part (3, 8) of the mass of elastomer defining cavities (6,7) which allow an axial removal of the mould, one (1) of the elements further comprising the outer armature (5) while the other element (2) comprises a secondary armature (10). The outer armature (5) and secondary armature (10) are interconected by a setting operation after having axially clamped together the two elements (1, 2).

8 Claims, 4 Drawing Sheets

FOREIGN PATENT DOCUMENTS

| | | |
|---|---|---|
| 0071698 | 4/1982 | European Pat. Off. |
| 0072262 | 2/1983 | European Pat. Off. |
| 0163817 | 12/1985 | European Pat. Off. |
| 547194 | 2/1934 | Fed. Rep. of Germany |
| 728501 | 11/1942 | Fed. Rep. of Germany |
| 1625389 | 7/1970 | Fed. Rep. of Germany |
| 7407909 | 5/1977 | Fed. Rep. of Germany |
| 2948408 | 6/1981 | Fed. Rep. of Germany |
| 926846 | 11/1947 | France |
| 1242350 | 8/1960 | France |
| 1336186 | 7/1963 | France |
| 1380784 | 10/1964 | France |
| 1540380 | 8/1968 | France |
| 1549300 | 11/1968 | France |
| 2349066 | 11/1977 | France |
| 2394715 | 1/1979 | France |
| 2435632 | 4/1980 | France |
| 2547378 | 6/1984 | France |
| 2555272 | 5/1985 | France |
| 811748 | 4/1959 | United Kingdom |
| 2041485 | 9/1980 | United Kingdom |
| 2086530 | 5/1982 | United Kingdom |
| 2166516 | 5/1986 | United Kingdom |

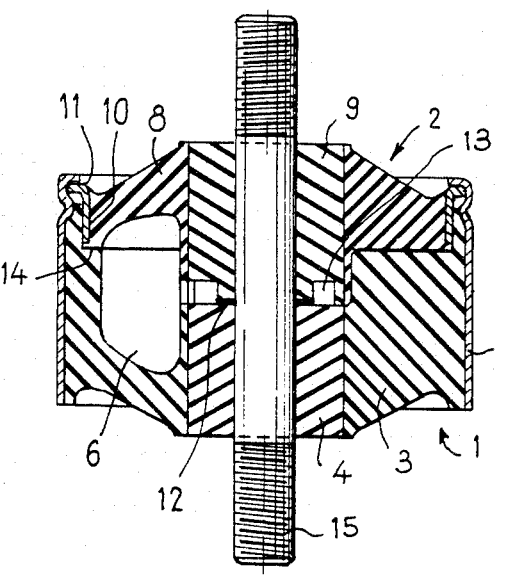
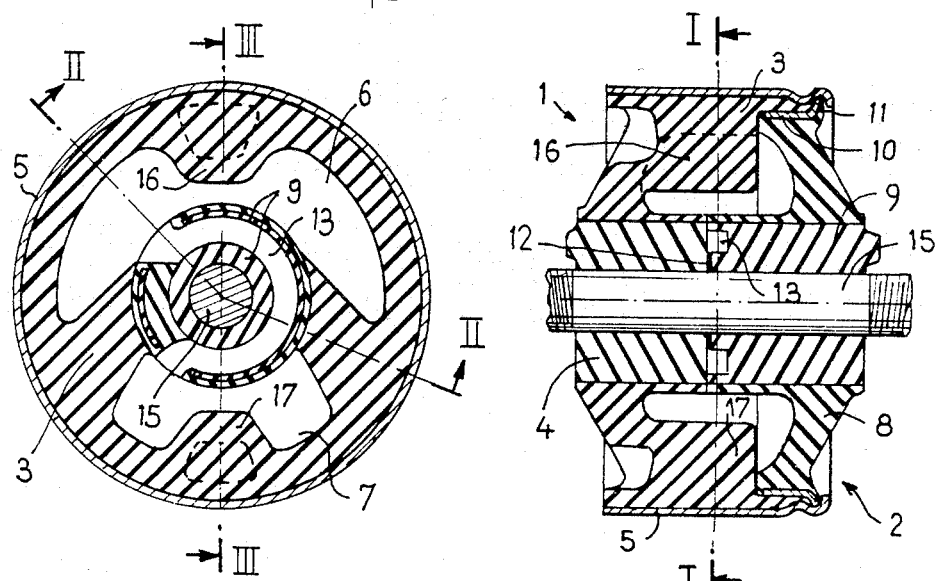
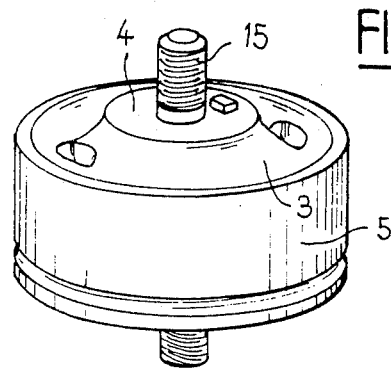

HYDRO-ELASTIC ARTICULATION

The present invention relates to an elastic articulation comprising an inner armature or plate and an outer armature or plate interconnected by a mass of an elastomer in which are formed two chambers filled with liquid and communicating with each other through a passageway.

In a known structure, such an articulation is made in two parts: a first part is formed by the inner armature, the mass of elastomer and an intermediate peripheral armature, the chambers communicating with the exterior; a second part is formed by an outer armature which is a tight fit on the intermediate armature so as to close the chambers. It will be understood that the quality of the seal depends on the precision with which the intermediate and outer armatures are made, which constitutes an appreciable constraint.

An object of the present invention is to provide an articulation which does not have this drawback.

According to the invention, the articulation is formed by two elements each constituted by a part of the inner armature and a part of the mass of elastomer defining cavities which allow an axial direction of removal from the mould, one of the elements further comprising the outer armature while the other element comprises a secondary armature, the outer and secondary armatures being interconnected by a setting operation after an axial clamping together of the two elements.

According to a first embodiment, the pasageway putting into communication the chambers formed by the cavities is provided between the confronting ends of the two parts of the inner armature.

According to a second embodiment, the passageway putting into communication the chambers formed by the cavities is provided between the secondary and outer armatures.

According to a third embodiment, in which the two chambers are interconnected by a passageway provided between the secondary and outer armatures, said chambers are also interconnected by two secondary passageways arranged in parallel with the connecting passageway and each provided with a check valve, these valves being normally closed but opening in opposite directions in the case of a large pressure difference between the two chambers.

According to other features:

the secondary passageways are formed in one of the inner armatures;

each of the secondary passageways defines a seat with which a respective valve member cooperates;

said inner armature has in the side thereof adjacent to the other inner armature an annular recess which opens at two diametrically opposed points onto the two secondary passageways in the vicinity of the seats, a ring being received in this recess and including two radial finger members which constitute said valve members.

Several non-limiting embodiments of the invention will be described hereinafter with reference to the accompanying drawings, in which:

FIG. 1 is a sectional view of a first embodiment of the articulation according to the invention taken on line I—I of FIG. 3 perpendicular to the axis of the articulation;

FIG. 2 is a sectional view taken on line II—II of FIG. 1;

FIG. 3 is a sectional view taken on line III—III of FIG. 1;

FIG. 4 is a perspective view of the articulation shown in FIGS. 1 to 3;

Figure 5:
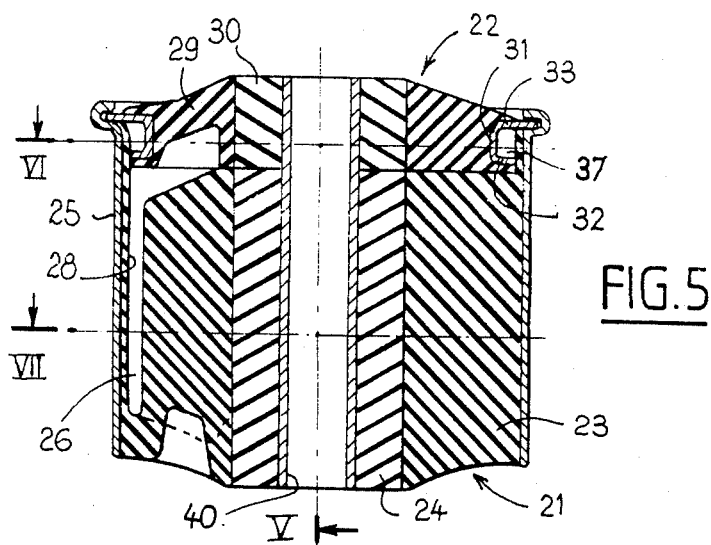
FIG. 5 is a sectional view of a second embodiment of the articulation according to the invention, taken on line V—V of FIG. 6.

The articulation shown in FIGS. 1 to 4 comprises the assembly of two elements 1 and 2.

The element 1 comprises a block 3 of elastomer bonded or adhered to a central armature or plate 4 and to an outer armature or plate 5. Formed in the block 3 are two cavities 6, 7. The cavities 6, 7 are designed and arranged in the block 3 so that the block 3 can be removed axially from a mould. For example, cavities, bores, holes, and the like are all axially oriented in the mould to avoid use of radially extending mould elements.

The element 2 comprises a block 8 of elastomer bonded or adhered to a central armature or plate 9 and to a secondary armature or plate 10 which has a generally cylindrical shape and terminates in an outwardly extending formed-over flange 11, this armature 10 having a diameter less than that of the outer armature 5. The side of the central armature 9 adapted to be applied against the central armature 4 of the first element 1 is provided with a layer 12 of elastomer adapted to provide a seal. Formed on the same side of the central armature 9 is a passageway 13 of partly circular shape and communicating with the exterior of the armature 9 at each of the ends thereof.

The secondary armature 10 is adapted to be engaged in a corresponding cylindrical portion of the block 3 of the first element 1 until contact is reached along a joint plane 14.

After axially clamping the two elements 1 and 2 against each other along the joint plane 14 and in a plane pendicular to central armatures 4 and 9, the outer armature 5 is connected to the flange 11 of the intermediate armature 10 by a setting or forming-over operation. According to a known method, this operation is carried out in the immersed state so as to fill with a suitable liquid, usually water to which anti-freeze has been added, the chambers 6, 7 provided between the blocks 3 and 8 of elastomer.

With the elements 1 and 2 assembled, their central armatures 4 and 9 constitute the conventional inner armature of an elastic articulation. This central armature is adapted to be connected to an element to be insulated, for example by a stud 15, while the outer armature 5 is adapted to be connected to another element (not shown).

An articulation constructed in this way is highly reliable and provides a maximum guarantee in respect of the sealed quality thereof.

FIGS. 1 and 3 show radial inner projections 16 and 17 adapted to act as movement limiters by abutment against the inner armature 4, 9.

In the described embodiment, the chambers 6, 7 have different shapes. It will understood that they could have the same shape. Likewise, the connection passageway between the cavities 6, 7 may be provided in the two parts 4 and 9 of the inner armature.

Figure 6:
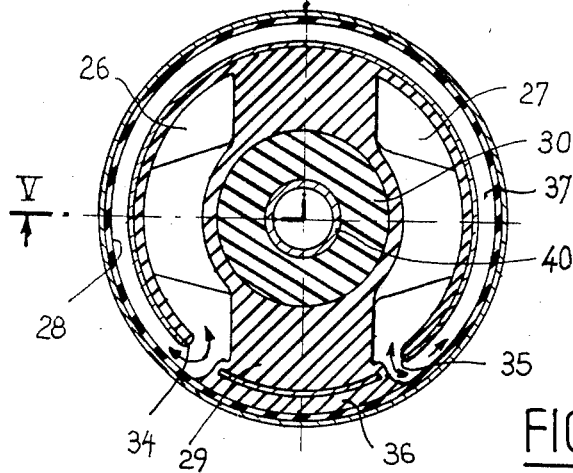
FIG. 6 is a sectional view in the plane VI of FIG. 5.
Figure 7:
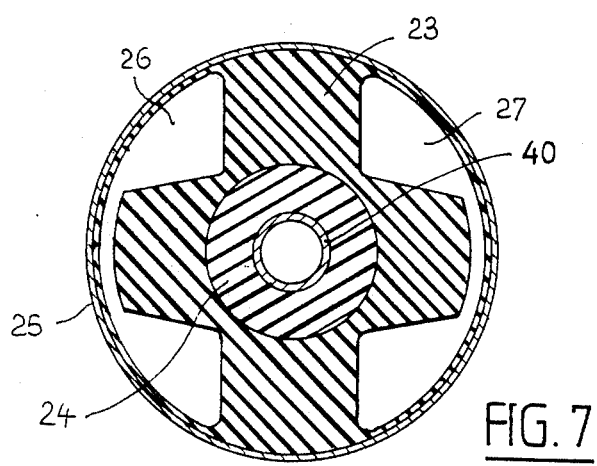
FIG. 7 is a sectional view in the plane VII of FIG. 5.

The articulation shown in FIGS. 5 to 7 is formed by the assembly of two elements 21 and 22.

The element 21 comprises a block 23 of elastomer bonded or adhered to a central armature or plate 24 and to an outer armature or plate 25. Formed in the block 23 are two cavities 26, 27 allowing an axial removal of the mould. The inner surface of the outer armature 25 defining the cavities 26 and 27 is provided with a layer 28 of elastomer.

The element 22 comprises a block 29 of elastomer bonded or adhered to a central armature or plate 30 and to a secondary armature or plate 31 which has an outwardly open U-shaped cross-section with unequal branches 32, 33. The narrowest branch 32 is adapted to be engaged in the outer armature 25 of the element 21, while the widest branch 33 is adapted to be connected by a setting operation with the end of this armature 25 after axially clamping together the two elements 21 and 22.

Provided in the secondary armature 31 are two orifices 34, 35 which are relatively close together and each of which opens onto one of the chambers formed by the cavities 26 and 27. In the shortest path between these orifices 34, 35, the interior 36 of the U formed by the secondary armature 31 is filled with an elastomer, while the longest path forms, with the outer armature 25, a passageway 37 of great length which puts the two chambers into communication with each other.

In this embodiment, the elements 21 and 22 are shown to be mounted on a central tube 40 allowing the passage of a pin (not shown) for connection to a structure to be insulated, while the outer armature 25 is adapted to be connected to another structure (not shown).

This second embodiment has the same advantages as the first embodiment.

The embodiment of the articulation illustrated in FIGS. 8 to 13 is intended to provide an improvement whereby it is possible to modify the characteristics of flow of the liquid between the two chambers formed in the articulation, so as to provide a variable damping effect and a variation in the stiffness as a function of the amplitude and the frequency of the excitation. In other words, this improvement has for purpose to reduce the stiffness of the whole of the articulation and to increase its damping effect in the event of a shock or, more generally, of a high velocity of relative displacement between the structures interconnected by the articulation.

The articulation shown in FIGS. 8 to 13 is formed by the assembly of two elements 41 and 42.

Figure 9:
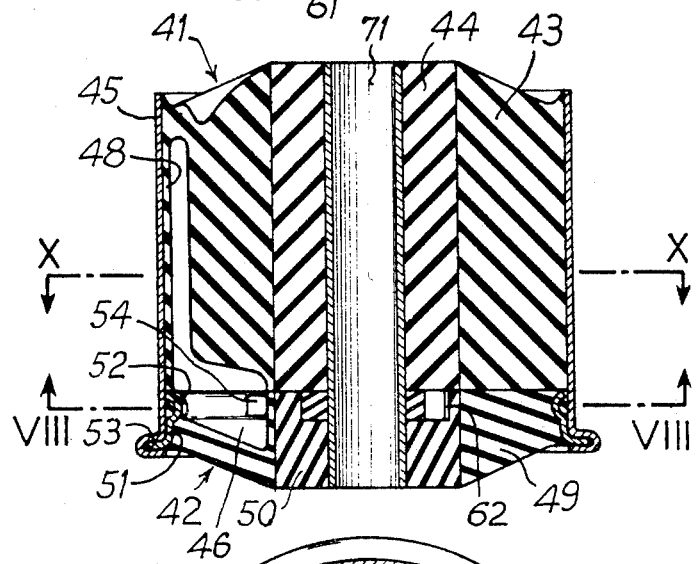
FIG. 9 is a sectional view taken on line IX—IX of FIG. 3.
Figure 10:
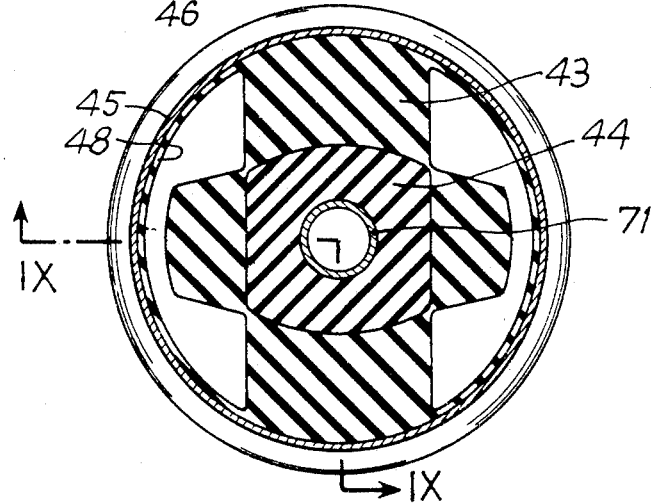
FIG. 10 is a sectional view taken on line X—X of FIG. 9.

The element 41 comprises a block 43 of elastomer bonded or adhered to a central armature or plate 44 and to an outer armature or plate 45. Formed in the block 43 are two cavities 46, 47 which allow an axial removal of the mould. The inner surface of the outer armature 45 defining the cavities 46 and 47 is provided with a layer 48 of elastomer connected to the block 43 in the upper part of the latter (FIG. 9).

The element 42 comprises a block 49 of elastomer bonded or adhered to a central armature or plate 50 and to a secondary armature or plate 51 having an outwardly open U-shaped cross-section. A branch 52 of the branches of the U is adapted to be engaged in the outer armature 45 of the element 41 and the other branch is extended by a flange 53 adapted to be connected by a setting operation with the end of the armature 45, after axially clamping together the two elements 41 and 42.

Provided in the secondary armature 51 are four orifices 54, 55, 56, 57. The orifices 54, 55 open onto the chamber 46 of the chambers formed between the blocks of elastomer, and the orifices 56, 57 open onto the other chamber 47. The orifices 54, 56, on one hand, and 55, 57, on the other hand, respectively communicate with one another through passageways 58, 59 formed between the secondary armature 51 and the outer armature 45, while the interior of the U constituted by the secondary armature is filled with elastomer between the orifices 54 and 55, on one hand, and 56 and 57, on the other hand.

Optionally, a localized deformation 60, 61 of the secondary armature 51 provides a calibrated section of passage in the path of the passageways 58 and 59.

Figure 8:
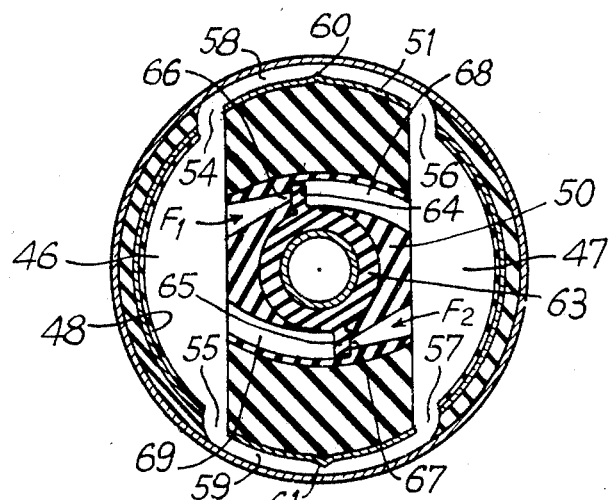
FIG. 8 is a sectional view of the articulation taken on line VIII—VIII of FIG. 9.
Figure 12:
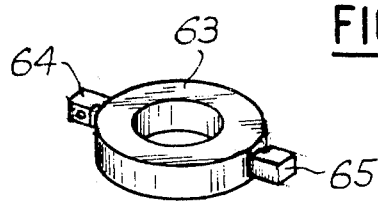
FIG. 12 is a perspective view of a component element of the articulation.
Figure 13:
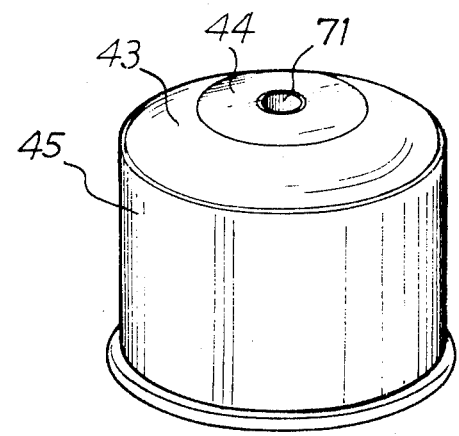
FIG. 13 is a perspective assembly view of the articulation shown in FIGS. 8 to 12.

The surface of the central armature 50 adapted to be applied against the central armature 44 defines a recess 62 in which is placed a ring 63 of elastomer including two substantially radial finger members 64, 65 (FIG. 12). Each of these finger members is adapted to be applied against a seat 66, 67 defining an orifice of reduced section formed in a secondary passageway 68, 69 provided in the armature 50, these two passageways putting the chambers 46 and 47 into communication with each other. The finger members 64 and 65 therefore constitute check valve members which allow liquid flow only in one direction (F1 or F2) in each of the secondary passageways 68, 69 (FIG. 8).

In respect of low velocities of flow of the liquid between the chambers 46, 47, the flow occurs solely through the main passageways 58, 59.

In respect of high velocities of flow, for example in the case of a shock resulting in a large pressure difference between the chambers 46, 47, one of the valve members 64, 65 moves away from its seat 66, 67 and liquid also flows through the corresponding secondary passageway 68, 69 and thus reduces the stiffness of the articulation and increases the damping effect.

Figure 11:
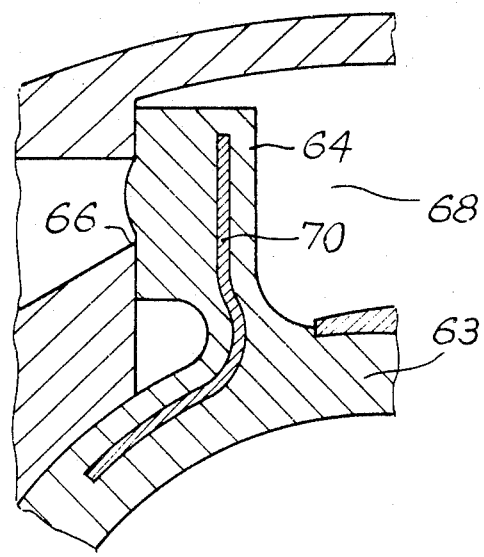
FIG. 11 is a sectional view of an enlarged detail of FIG. 8.

Depending on the desired result, the stiffness of the valve members 64, 65 may be chosen by acting on their thickness or by embedding therein thin sheet metal 70 as shown in FIG. 11.

In the described embodiment, two main passageways 58, 59 are provided between the chambers 46, 47. It will be understood that the invention is applicable in the same way to an articulation which has only a single main passageway as shown in FIGS. 5 to 7.

As in this preceding embodiment, the elements 41 and 42 are mounted on a central tube 71 which permits the passage of a pin (not shown) for connection with a structure to be insulated, while the outer armature 45 is adapted to be connected to another structure (not shown).

What is claimed is:

1. An elastic articulation comprising an inner armature and an outer armature, a mass of elastomer interconnecting the inner armature and outer armature, two chambers provided in said mass, a liquid filling the chambers and a connecting passageway interconnecting the chambers, said articulation being formed by two elements, each element being constituted by a part of the inner armature and a part of the mass of elastomer, cavities defined in the mass of elastomer which allow an axial removal of a mould for producing the mass of elastomer, a first of the elements further comprising the outer armature while a second of the elements comprises a secondary armature, the outer armature and the secondary armature being interconnected by a setting operation after an axial clamping together of the two elements.

2. An articulation according to claim 1, wherein the passageway interconnecting the chambers formed by the cavities is provided between confronting ends of two parts of the inner armature.

3. An articulation according to claim 1, wherein the passageway interconnecting the chambers formed by the cavities is provided between the secondary armature and the outer armature.

4. An elastic articulation comprising an inner armature and an outer armature, a mass of elastomer interconnecting the inner armature and outer armature, two chambers provided in said mass, a liquid filling the chambers and a connecting passageway interconnecting the chambers, said articulation being formed by two elements each element including a part of the inner armature and a part of the mass of elastomer, cavities defined in the mass of elastomer which allow an axial removal of a mould for producing the mass of elastomer, a first of the elements further comprising the outer armature while a second of the elements comprises a secondary armature, the outer armature and the secondary armature being interconnected by a setting operation after an axial clamping together of the two elements;

wherein the passageway interconnecting the two chambers is defined between the secondary armature and the outer armature and two secondary passageways arranged in parallel with the or each main connecting passageway also interconnect the two chambers, a check valve being inserted in each secondary passageway, said valves being normally closed and adapted to open in opposite directions under the effect of a given pressure difference between the two chambers.

5. An articulation according to claim 4, wherein the secondary passageways are provided in one of the inner armatures.

6. An articulation according to claim 5, wherein each of the two secondary passageways defines a seat with which a respective valve member cooperates.

7. An articulation according to claim 6, wherein said inner armature comprises in a surface thereof adjacent to the other inner armature an annular recess which opens, at two diametrically opposed points, onto the two secondary passageways in the vicinity of said seats, a ring being received in said recess and including two radial finger members which constitute said valve members.

8. An articulation according to claim 7, comprising a resiliently yieldable metal reinforcement within each radial finger member.

* * * * *